June 12, 1934.    G. D. BRADSHAW    1,962,131
METHOD OF FEEDING WATER TO BOILERS
Filed Jan. 30, 1930    2 Sheets-Sheet 2
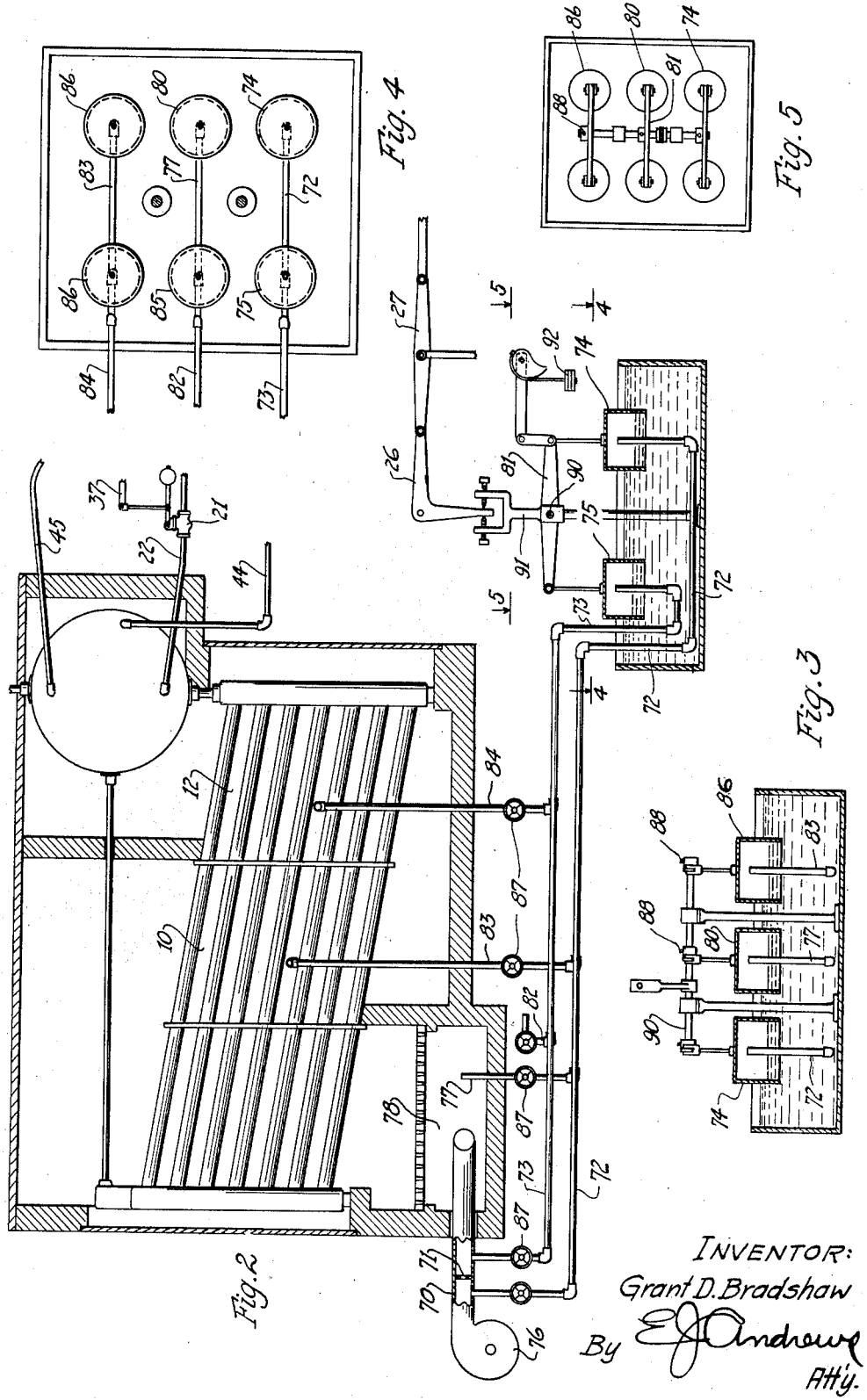
INVENTOR:
Grant D. Bradshaw
By E. J. Andrews
Atty.

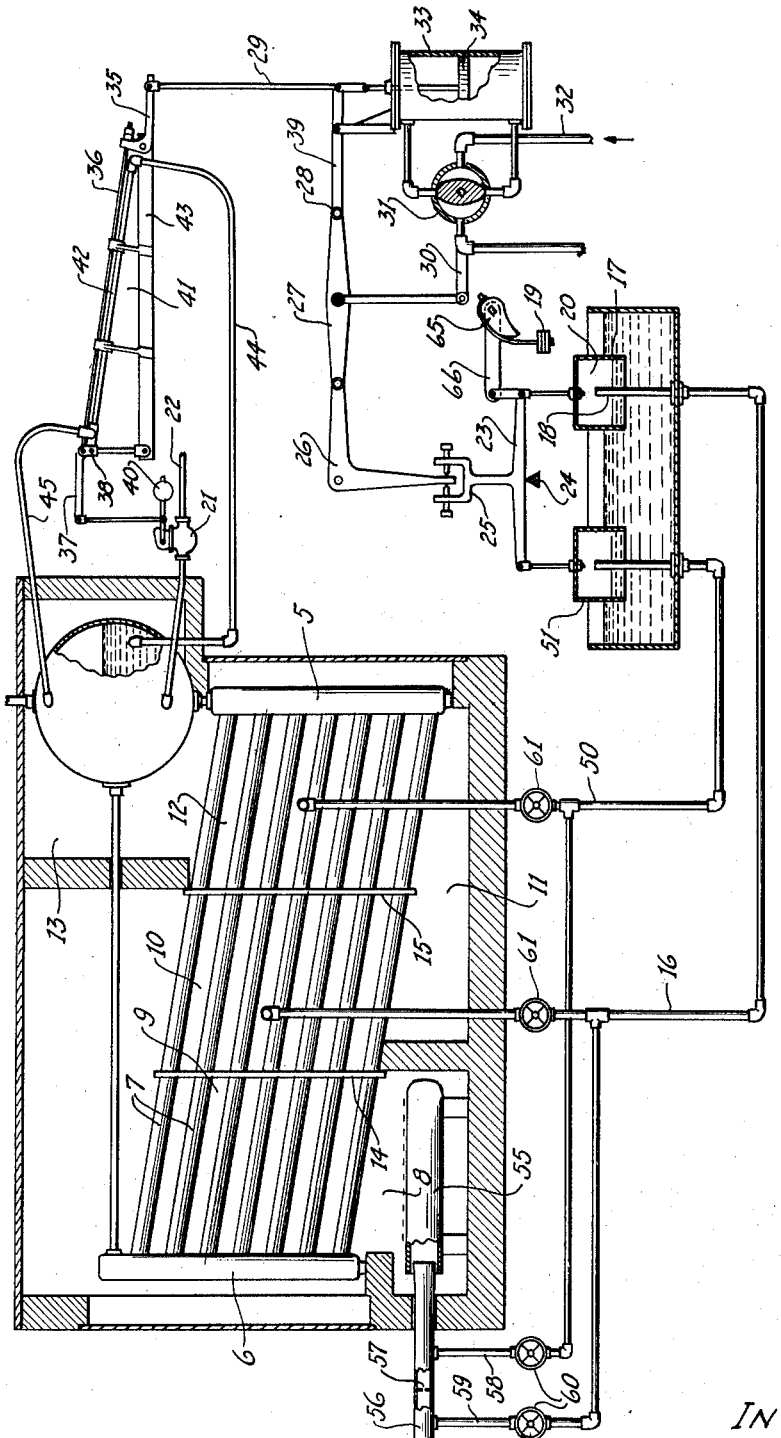

Patented June 12, 1934

1,962,131

UNITED STATES PATENT OFFICE 1,962,131

METHOD OF FEEDING WATER TO BOILERS

Grant D. Bradshaw, Beaver, Pa., assignor to Bradshaw & Company, Pittsburgh, Pa., a corporation of Pennsylvania Application January 30, 1930, Serial No. 424,465

7 Claims. (Cl. 122—451)

This invention relates to methods of feeding water to boilers and to apparatus for carrying out the method, and a particular object is to suitably correlate the fire intensity and the water feed to the boilers.

Of the accompanying drawings which are more or less diagrammatic, Fig. 1 is an elevation, partly in section, of a boiler system and feed water regulator apparatus therefor, which embodies the features of my invention; Fig. 2 is an elevation of a modification of the system; Fig. 3 is an elevation of a portion of the apparatus of Fig. 2 but at an angle of 90° therefrom; Fig. 4 is a plan view along the line 4—4 of Fig. 2; and Fig. 5 is a plan view along the line 5—5 of Fig. 2.

In view of the high pressures and capacities at which modern boilers are frequently operated, it becomes desirable to have a method of controlling the flow of water to the boiler in accordance with the steam flow from the boiler, that is, the load on the boiler. This is particularly so when material changes in the load occur frequently. The feed water regulator system will then quickly respond so as to supply more or less water to compensate for the change in load. At the same time, it is desirable to have apparatus for varying the flow of water to the boiler in accordance with the elevation of the water level in the boiler. In case of material changes in load, there is usually a material change in the water level elevation, owing to the compression or expansion of entrained steam in the water, as the pressure on the boiler usually varies materially for a brief time. Also, leakage of steam, blowing down the boiler, and the like, causes variations in water level which have no particular bearing on the load on the boiler. For this reason, apparatus is required for maintaining substantially uniform or within certain desired limits the water level elevation in the boiler.

However, in view of the fact that the steam flow changes necessarily correspond more or less with the changes in fire intensity and, hence, with changes in the amount of fuel and air supplied to the furnace, and the changes in the amount of gases of combustion which pass through and from the furnace, I have found it desirable to control the flow of water to the boiler by these changes in the gases of the furnace instead of by changes in steam flow. For instance, if provision is made for an increase in fire intensity to anticipate the increase in load, the pressure on the boiler may be maintained more nearly uniform, and the increase in water supply to the boiler may be made to occur substantially simultaneously with the increase in load. While, if the increase in water supply depends upon the increase in steam flow, there will be often an undesirable lag in the supply of water.

My method, therefore, consists in controlling the flow of water to the boiler by the flow of gases thereto and through the furnace of the boiler, so as to make the flow of water substantially proportional to the flow of the gases. But, at the same time, I vary this proportionality sufficiently to maintain substantially uniform or within desired limits, the water level elevation in the boiler.

To illustrate my invention, I have shown in section an ordinary type of boiler which is heated by gas or coal, or oil might be used by modifications which would be obvious to those familiar with the art. When any of these fuels are used, as is well understood, the burned gases pass through the passageways in the boiler and, in case of changes in the fire intensity, there will be more or less variations in pressure on these gases, and the pressure will also vary from one passageway to another.

In the illustration of Fig. 1, the boiler system comprises the headers 5 and 6, which are connected in an ordinary manner by water tubes 7, and the burned gases pass from the combustion chamber 8 upwardly through a passageway 9, and then downwardly through another passageway 10 into the chamber 11, and upwardly through the passageway 12 to the chamber 13, and thence out of the chimney. Baffles 14 and 15 form side walls for the passageways. Obviously, as the fire intensity is varied by supplying more fuel and air to the fire, the pressure on the burned gases will vary accordingly and, by means of a pipe 16, having its upper end open in the passageway 10, the gas pressure may be transmitted to some motor means for controlling the flow of water to the boiler. I prefer, in this instance, to transmit the pressure of the gas to an inverted bell 17 in a tank of water, the end 18 of the pipe projecting into the chamber 20 of the bell. As the fire intensity is increased, the increased pressure in the passageway 10 will elevate more or less the bell 17 and, by means of suitable mechanism, the movement of the bell may be transmitted to the feed water valve 21, which supplies water to the boiler through the supply pipe 22.

Although the variations in pressure in the passageway 10 may be used alone to vary the water flow according to the gas flow through the furnace, yet, I prefer to make use of the differences in gas pressure at two points in the furnace. Any two suitable points may be used, but I prefer to use a second pipe 50, one end of which opens in the passageway 12 of the system, and the other end opens within the bell 51. The two bells are arranged to co-operate with each other in operating the feed water valve 21 of the boiler.

Both bells are connected to a lever 23 as indicated, and when the draft of the furnace is increased in any manner, there will be an increase in the pressure drop from the passageway 10 to the passageway 12, and this will cause a corresponding variation in the pressures which are effective in the bells 17 and 51 and, thus, the two bells will coact to operate the lever 23 and, hence, to operate the mechanism connecting the bells with the valve 21.

The lever 23 has a pivot 24 and an arm 25. The arm 25 is arranged to operate a lever 26 which, in turn, operates a lever 27 having a fulcrum 28. As the lever 27 is operated, the arm 30 of a rotary valve 31 is operated, and the fluid under pressure passes from the pipe 32 into one end or the other of the cylinder 33. If the fire intensity is increased, the bell 17 will be forced upwardly, the arm 30 will be forced downwardly and the fluid will flow into the upper end of the cylinder 33. This will force downwardly the piston 34 and operate the lever 35 by means of the link 29. The lever 35 operates a slidably mounted rod 36. The rod, in turn, operates the lever 37, having a fulcrum 38, and the valve 21 is thus opened more so as to allow an increase in flow of water to the boiler to compensate for the increase in flow of gas through the furnace and for the increased load on the boiler which is expected, or which has already occurred, as the case may be.

To prevent over-running of the valve 21, I provide means for stopping its movement when sufficiently varied. These means comprise a lever 39 which supports the floating fulcrum 28, and as the piston 34 is forced downwardly, the lever 39 is operated and elevates the fulcrum 28. This in turn rotates the valve 31 so as to close the ports thereof and stop the operation of the valve 21.

It will be understood that in case of a decrease in fuel consumption, the drop in pressure from the passageway 10 to the passageway 12 will decrease and the entire process will be reversed. The fluid will flow into the lower end of the cylinder 33, and the movement of the piston will allow the weight 40 to close more the valve, so as to reduce the flow of water to the boiler to compensate for the reduction in load.

In order to maintain the water level in the boiler at a uniform elevation or within the desired limits, the feed water regulator 41 may be installed. This may be any suitable type of feed water regulator, such as are in common use. I prefer the thermostatic tube 42 mounted on the frame 43, with its lower end fixed to the frame. The ends of the tube are connected respectively by pipes 44 and 45 to the water space and the steam space of the boiler. And in a well known manner, the water is thus maintained in the tube at substantially the same level as in the boiler. The fulcrum 38 of the lever 37 is pivoted to the free end of the tube 42. As a consequence, when the water in the boiler sinks, the water in the tube will also sink and the tube will expand and force upwardly the long arm of the lever 37 and, thus, open more the valve 21, providing an increased flow of water to the boiler. Likewise, if the water rises above the desired limits, the tube 42 will contract and allow the weight 40 to close somewhat the valve 21.

It will be understood that the exact points where the pressure changes in the furnace are utilized are not material, and the pressure of the gases supplied to the fire place of the furnace may be used as well as the burned gasses. For instance, 55, Fig. 1, indicates a gas burner supplied with gas through the gas main 56 in an ordinary manner. Or it may be considered as supplying oil to an oil burner. In either case, an orifice 57 may be inserted in the supply pipe and pipes 58 and 59 may be connected to the supply pipe on each side of this orifice, and the other ends of the pipes may open under the bells 17 and 51. As illustrated in Fig. 1, the pipes 58 and 59 may be connected to the pipes 16 and 50 hereinabove referred to. By means of the valves 60 and 61, either pair of pipes may be made effective in operating the system.

As is well understood, as the fuel flows through the orifice 57, there will be a drop in pressure through the orifice which will be effective in the pipes 58 and 59, the pressure in the pipe 59 being materially greater than in the pipe 58, and in case of variations in the amount of fuel supplied to the burner, there will be corresponding variations in the drop in pressure through the orifice and, hence, in the differences in pressure in the two pipes.

In case of increase in load on the boiler and a corresponding increase in fuel supplied, the pressure difference will increase and the bell 17 will be raised more, as was the case with the increase in flow of the burned gases, and this in turn will operate the mechanism, as explained, in such a manner as to open more the valve 21.

Inasmuch as the drop in pressure through the passageways of the system, or through the orifice 57, varies at a greater rate than the variation in flow of the gas and, hence, at a greater rate than the variations in the steam flow which corresponds to the gas flow, it is desirable to open the feed water valve at a lesser rate than the drop in pressure of the gas, otherwise, the variation in water flow would be greater than the variation necessary to compensate for the variation in load. To compensate for this, means may be provided for moving the valve at a lesser rate than the rate of change in pressure.

In this instance, I have shown for the purpose a cam block 65 fixed to the pivot of an arm 66, to which the weight 19 is suspended. As the gas pressure increases and the bell 17 rises, the effect of the weight 19, because of the form of the cam surface, will increase at such a rate as to cause the movement of the bell to be substantially proportional to the flow of gas and, hence, to the flow of steam from the boiler. As a consequence, the operating mechanism connecting the bell with the valve and the valve itself will be operated accordingly. Hence, if the surface is properly formed, the movement of the valve will be substantially proportional to the variation in load.

Figs. 2, 3 and 5 illustrate a modified system for accomplishing substantially the same purpose. In this system, the furnace is shown with a grate for coal, and air is supplied in an ordinary manner to the fire place through the pipe 70. In this pipe is mounted an orifice 71, and pipes 72 and 73 are connected at one end to opposite sides of the orifice 71 and are in communication with the bells 74 and 75. As a consequence, when the air pressure is varied by means of the fan 76 or otherwise, the relative position of the bells 74 and 75 will be varied accordingly, and by means of the operating mechanism connecting the bells with the feed water valve, the valve will be operated to compensate the water flow for the variation in air supplied to the fire, which is to be in accordance with the variations in steam flow from the boiler.

Similarly, if desired, a pipe 77 may open in the chamber 78, and the other end may open under a bell 80 so that the variations in pressure in the chamber 78 may be transmitted to the bell 80. This bell also is operatively connected with a similar lever 81 and the movements of the bell 80 are thus transmitted to the feed water valve through the levers 26 and 27 and the rest of the operating mechanism. In this case, variations in pressure at one point of the system alone are used, and it is obvious that, with suitable mechanism, variations at other points also may be used alone without reference to the drop in pressure from one point to another. A pipe 82 opening into the atmosphere may be passed into a companion bell 85, so that the difference in pressure between the chamber 78 and the atmosphere will be effective in operating the two bells. However, obviously, except for slight modifications of atmospheric pressure, the result of this arrangement will be the same as with the single bell 80.

Also, pipes 83 and 84 may be used, as hereinabove described, in reference to Fig. 2, one end of these pipes being in the passageways 10 and 12 of the system, and the other ends opening under a pair of bells 86 which are also connected to a similar lever 81. All of the levers 81 may be mounted on a rotatably mounted shaft 90, and fixed to this shaft is an arm 91 which corresponds to the arm 25 of Fig. 1.

These three sets of pipes may be used simultaneously, if desired, or any one or two of the sets may be used by operating the valves 87, and the corresponding set screws 88 should be unscrewed, so as to render inoperative the corresponding levers. When all of the pipes are in use, the effective force operating on the lever arm 91 is increased proportionately, and any abnormal action of any of the gases acting on any of the pipes will be offset more or less by the normal action of the gases acting on the other pipes. But, if preferred, a single pair of pipes may be used. The mass of the weights 92 may be varied to meet the needs.

Although I have illustrated and described my invention with considerable detail, yet, it is to be understood that various modifications of details could be made without departing from the spirit of my invention as disclosed by the following claims. For instance, other suitable and well known apparatus might be used for making effective the gas or fuel pressures on the bells or on the valve itself.

I claim as my invention:

1. In a steam boiler system having heating means and water feeding means, means for passing gas under pressure to said heating means comprising a conduit having a restricted orifice therein, and means responsive to variations in the drop in gas pressure through said orifice for varying said feeding means substantially proportionally to the variations in gas flow through said orifice.

2. In a steam boiler system having heating means and water feeding means, said heating means comprising a conduit and means for passing gas through said conduit, a feed water valve in said feeding means, and means responsive to variations in the gas pressure drop in said conduit for varying the opening of said valve substantially proportionally to said gas flow therethrough.

3. In a steam boiler system as claimed in claim 2, means responsive to the variations in water level elevations in the boiler for increasing the opening of said valve when the water level sinks.

4. In a steam boiler system, means responsive to the variations in the boiler fuel supply, acting in combination with means responsive to variations in the boiler water level for increasing the water feed to the boiler as the water level sinks, the ultimate effect of each of said means being independent of the effect of the other means.

5. In a boiler system, boiler heating means and a feed water valve for the boiler, means responsive to the variations in the gas flow in said heating means for varying substantially proportionally the flow of water through said valve, said responsive means comprising a casing having a chamber with a yielding side, means providing communication between said chamber and said heating means, means operatively connecting said chamber side with said valve, and means yieldingly opposing the movement of said chamber side and increasing in opposition at a greater rate than the rate of increase of gas pressure in the chamber.

6. In a steam boiler system, means responsive to variations in the elevation of the water level in the boiler for varying the flow of water to the boiler, and means responsive to variations in the flow of fuel to the boiler for varying the water level responsive means so as to increase said water flow as the fuel flow increases, said latter means including means for producing substantially equality of fuel flow variations and water flow variations when the water level is substantially constant.

7. In a steam boiler system as claimed in claim 1, said responsive means comprising means for increasingly resisting the effect of the pressure drop through the orifice as the drop increases.

GRANT D. BRADSHAW.